United States Patent

[11] 3,539,041

[72] Inventor Columbus R. Sacchini
 Willowick, Ohio
[21] Appl. No. 791,109
[22] Filed Jan. 14, 1969
[45] Patented Nov. 10, 1970
[73] Assignee By mesne assignments to The Marquette
 Metal Products Company, Cleveland, Ohio,
 a corporation of Ohio

[54] ONE WAY BRAKE DEACTIVATED BY DRIVE AND ONE WAY CLUTCH
 11 Claims, 1 Drawing Fig.
[52] U.S. Cl. .................................. 192/8,
 192/12, 188/82.3, 188/134
[51] Int. Cl. ............. .............................. F16d 67/02
[50] Field of Search .................................. 192/12(B–1),
 8; 188/82.3, 82—34

[56] References Cited
UNITED STATES PATENTS
| | | | |
|---|---|---|---|
| 1,997,646 | 4/1935 | Miller .................... | 192/8 |
| 2,946,417 | 6/1960 | Hungerford ........... | 192/8 |
| 3,276,553 | 10/1966 | Tilloy .................... | 192/8 |
| 3,356,194 | 12/1967 | Stout .................... | 192/12(B–1)UX |
| 3,361,235 | 1/1968 | Sacchini ................. | 192/8 |

Primary Examiner—Benjamin W. Wyche
Attorneys—Arthur Frederick and Victor D. Behn ABSTRACT: A clutch-brake mechanism is provided in combination with a load actuating apparatus having an input shaft rotatively connected to an output shaft to effect bidirectional rotation of the output shaft and the raising and lowering of a load. The clutch-brake mechanism has a fixed hub or drum coaxially disposed with respect to the output shaft and a control sleeve rotatively mounted on the output shaft and hub. A coil spring is concentrically disposed with respect to the output shaft and hub and is in preloaded or in interference fit with the output shaft and hub to prevent, in one operative condition, rotation of the output shaft. The coil spring is so wound that the frictional torque on the spring induced by rotation of the output shaft in a direction to raise the load causes the coils, embracing the output shaft, to expand and thereby release the latter for rotation. A control means is constructed and arranged to interconnect the control sleeve and input shaft to transmit rotation from the input shaft to the control sleeve only when the output shaft is being rotated by the input shaft in the load lowering direction so that the coil spring portion, which grips the hub and is connected to the control sleeve, will be caused to expand and release thereby the output shaft for controlled rotation in a load lowering direction.

Patented Nov. 10, 1970     3,539,041
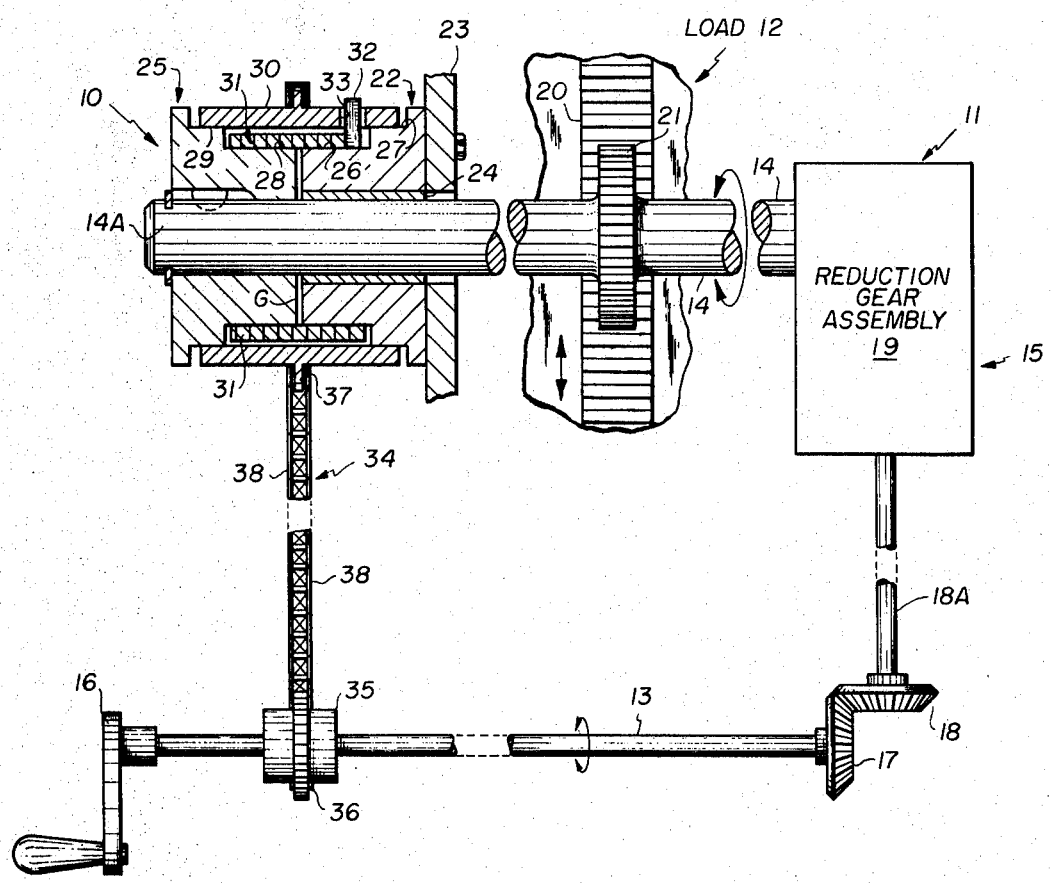
INVENTOR
COLUMBUS R. SACCHINI
BY
*Arthur Frederick*
ATTORNEY

ONE WAY BRAKE DEACTIVATED BY DRIVE AND ONE WAY CLUTCH

BACKGROUND OF THE INVENTION

This invention relates to a motion arresting mechanism and, more particularly, to a clutch-brake mechanism for a load-raising and lowering apparatus.

In apparatuses for raising and lowering loads, such as hoists, winches, X-ray probe heads, and the like, it is necessary to provide for bidirectional rotation of the driven or output member and cessation of rotation of the output member upon mechanical failure to prevent release of the load under gravitational force.

Accordingly it is an object of this invention to provide in a load actuating apparatus a normally engaged clutch-brake mechanism which permits bidirectional rotation of the driven or output member when such is desired and arrests rotation of the latter upon mechanical failure.

It is another object of the present invention to provide in a load actuating apparatus a normally engaged clutch-brake mechanism in which the brake is automatically released when rotation is effected through the driving or input member in either direction.

SUMMARY OF THE INVENTION

It is therefore contemplated by the present invention to provide, in a load actuating mechanism comprising an input or driving member rotatively connected to an output or driven member to effect bidirectional rotation of the output member and the raising and lowering of a load, a normally engaged clutch-brake mechanism which comprises a spring clutch assembly of the sleeve controller type having a rotary part connected to the output member and a fixed part. A coil spring is in preloaded or interference fitting engagement with the rotary part and the fixed part, the preloading being of such magnitude as to prevent rotation of the rotary part and the output member. The coil spring is so formed that rotation of the rotary part, in a direction to raise the load, induces a frictional torque on the spring which causes the coils to expand and release their grip on the rotary part, thus releasing the output member for such rotation. A control means including a spring actuating means, such as a sleeve connected to the coil spring, is disposed to interconnect the spring actuating means and the input member for causing the spring to disengage and release its grip on the fixed part when the output member is rotated by the input member in a direction to lower the load, thus permitting, at will, controlled lowering of the load.

BRIEF DESCRIPTION OF THE DRAWING

The invention will be more fully understood from the following description when considered in connection with the accompanying diagrammatic drawing of the clutch-brake mechanism according to this invention.

DESCRIPTION OF THE PREFERRED EMBODIMENT

Now referring to the drawing, the reference number 10 generally designates the clutch-brake mechanism of this invention coacting with a load actuating apparatus 11 to permit the raising and lowering of a load 12, as for example, an X-ray probe head, and prevent movement of the load upon mechanical failure.

The load actuating apparatus 11 comprises an input member or shaft 13 and an output member or shaft 14, which shafts are rotatively connected together through a gear train 15.

The input shaft 13 is suitably journaled for rotation about its longitudinal axis in bearings, not shown. A means is provided for effecting bidirectional rotation of shaft 13, which means may be a handle 16, as shown, or other suitable source of rotary power, such as a reversible electric or fluid motor.

The gear train 15 may comprise bevel gears 17 and 18 and a reduction gear assembly 19. The bevel gear 17 is secured to input shaft 13, while bevel gear 18, meshing with bevel gear 17, is secured to a shaft 18A which is connected to reduction gear assembly 19. The reduction gear assembly 19 may comprise any suitable gear assembly, such as worm and wormwheel assembly, constructed and arranged to provide a reduction in angular velocity of output shaft 14 from input shaft 13. This gear reduction may be of a suitable magnitude, as for example, about 60 to 1. It is to be expressly understood that, while input shaft 13 and output shaft 14 have been shown and described as interconnected by a reduction gear assembly 19, and bevel gears 17 and 18, any means of transmitting bidirectional rotary motion of input shaft 13 to output shaft 14 may be employed without departure from the scope and spirit of this invention.

The load 12 is suitably supported for vertical movement by support means, not shown, and is provided with a vertically extending gear rack 20 which is disposed in meshing relationship with a pinion gear 21 carried by output shaft 14. As viewed from the right in the drawing, rotation of output shaft 14 and pinion gear 21, in a clockwise direction, causes a lowering of load 12, while counterclockwise rotation of output shaft 14 and pinion gear 21 effects a raising of load 12. (Whenever directions of rotation are set forth, it is to be assumed that the apparatus is being viewed from the right as illustrated in the drawing.)

The clutch-brake mechanism 10 has a hub 22 fixedly secured to a support or frame 23. The hub 22 has a coaxially disposed bearing 24 which is adapted to receive and support for rotation a shaft extension 14A of output shaft 14. An adapter 25 is secured, as by a key and keyway assembly, to shaft extension 14A for conjoined rotation with the latter adjacent to hub 22. The hub 22 is provided with successively reduced diameter portions to provide annular, peripheral bearing surfaces 26 and 27. Similarly, adapter 25 is provided with successively reduced diameter portions to provide annular, peripheral bearing surfaces 28 and 29, which are dimensioned so as to be coextensive with bearing surfaces 26 and 27, respectively. A control sleeve 30 is rotatively supported by bearing surfaces 27 and 29 of hub 22 and adapter 25, respectively. A spring 31, helically formed, is disposed concentrically with regard to adapter 25 and hub 22 to bridge the gap G between the adapter 25 and hub 22. The spring 31 is in preloaded or interference fitting engagement, at one portion, with bearing surface 28 of adapter 25. The opposite end of spring 31 is connected to control sleeve 30 by a toe portion 32 receivable in an aperture 33 in sleeve 30 and the adjacent portion of the spring is in preloaded or interference fitting relationship with bearing surface 26 of hub 22, thus the mechanism 10 is in a normally engaged or arrested condition. The spring is so formed that, upon rotation of shaft extension 14A and adapter 25 relative to sleeve 30 in a direction to lower load 12 (clockwise direction) the spring coils will tend to wrap down upon bearing surface 26 and grip the surface with greater force and thereby insure that no rotation of adapter 25 and shaft extension 14A will occur. However, rotation of shaft extension 14A and adapter 25 in a direction to raise load 12 (counterclockwise) will exert a frictional torque on the coils gripping bearing surface 28 which will cause the coils to expand and release the adapter and shaft extension for rotation.

To selectively and automatically control relative movement between fixed hub 22 and control sleeve 30 to effect disengagement of the clutch-brake mechanism, the clutch-brake mechanism includes a control means 34 disposed to interconnect input shaft 13 and control sleeve 30. The control means 34 includes a one-way clutch 35 mounted on input shaft 13 and having a sprocket 36 secured thereon. The control means also has a sprocket 37 secured to control sleeve 30 and a chain 38 extending between sprockets 36 and 37. One-way clutch 35 is of any suitable construction wherein rotation of input shaft 13, in a direction to raise load 12 (counterclockwise direction), is not transmitted to sprocket 36, and wherein rotation of input shaft 13 is transmitted to sprocket 36 upon rotation in a direction to lower load 12 (clockwise direction). The ratio of the size of sprocket 36 to sprocket 37 is such that sprocket 37 rotates sleeve 30 at a slightly greater velocity than the angular velocity of adapter 25. By providing this differential in rotational speed, release of control spring 31 from engagement with bearing surface 26 of hub 22 is achieved, and shaft extension 14A is thereby released for controlled rotation in a load-lowering direction.

In operation of the clutch-brake mechanism 10 for controlling the load actuating apparatus 11 as herein described, rotation of input shaft 13 in a direction to raise load 12, (counterclockwise) output shaft 14 and its extension 14A rotate in a counterclockwise direction. Pinion gear 21 which is in mesh with rack 20, rotates counterclockwise to thereby force rack 20 and load 12 upwardly. In this operative condition, counterclockwise rotation of the adapter 25 relative to spring 31 generates a frictional torque on the engaging coils of spring 31 which forces the spring coils embracing bearing surface 28 to expand and thereby release adapter 25 and hence, shaft extension 14A and shaft 14 for rotation. Under this operative condition, adapter 25 rotates relative to the control sleeve which is held stationary by the interconnection of toe 32 of spring 31 and aperture 33 of the control sleeve. Instantaneously with the cessation of rotation of the shaft extension 14A and adapter 25, the coil portion of spring 31, adjacent bearing surface 28, contracts to again grip the bearing surface, thereby arresting rotation of the shaft extension 14A and the shaft 14. In rotation of input shaft 13 in a direction to lower load 12 (clockwise direction), pinion gear 21, through gear train 15 and output shaft 14, is rotated clockwise to force the gear rack 20 and load 12 downwardly. This clockwise rotation of output shaft 14 and its extension 14A causes rotation of adapter 25 in a clockwise direction. To release output shaft 14 for this load-lowering direction of rotation (clockwise), in this operative condition, rotation of input shaft 13 is transmitted to sprocket 36, through one-way clutch 35, which rotation of sprocket 36, in turn, effects rotation of sprocket 37 and control sleeve 30 in the same direction as output shaft 14. The ratio of the sprockets 36 and 37 is such that the control sleeve 30 rotates at a slightly greater angular speed than adapter 25 to thereby cause the coils of control spring 31 to expand and unwrap from around bearing surface 26 of hub 22, thus allowing output shaft 14 to rotate in the direction to lower load 12. Again, immediately upon cessation of rotation of input shaft 13 and, hence, control sleeve 30, the coils of spring 31, adjacent bearing surface 26, contract to grip the bearing surface and again arrest rotation of shaft 14.

In the event of sudden and unexpected mechanical failure in the gear train 15, as for example, the breaking of a gear tooth, or meshed gears disengaging, while raising or lowering load 12, output shaft 14 is thereby released for rotation under the urging of the downward force of load 12, but, since input shaft 13 and control sleeve 30 immediately becomes stationary and adapter 25 is not being rotated counterclockwise to expand the coils of spring 31, coil spring 31 immediately assumes a braking relationship with the bearing surfaces 26 and 28 of hub 22 and adapter 25, respectively, so that adapter 25, shaft extension 14A and output shaft 14 are held against rotation.

It is believed now readily apparent that this invention provides a novel, normally engaged, clutch-brake mechanism for a load-raising and -lowering apparatus which permits bidirectional rotation of the output shaft for raising and lowering a load when such rotation is effected by the rotation of the input member and automatically effects braking action of the output shaft when rotation thereof is urged by the load rather than the input member. It is also a mechanism which automatically and instantaneously functions to brake and prevent movement of the load whenever rotation to raise or lower the load ceases either intentionally or by mechanical failure in the gear train.

Although but one embodiment of the invention has been illustrated and described in detail, it is to be expressly understood that the invention is not limited thereto. Various changes, such as substitution of a pulley sheave and belt for the sprocket and chain belt elements, can be made in the arrangement of parts without departing from the spirit and scope of the invention, as the same will now be understood by those skilled in the art.

I claim:

1. A clutch-brake mechanism for a load actuating apparatus, having an input member rotatively connected to an output member to effect bidirectional rotation of the output member and the raising and lowering of a load, comprising:
   a. a spring brake assembly having:
      i. a rotary part connected to the output member and a fixed part;
      ii. a helically wound spring connected to the rotary part and the fixed part;
      iii. the spring being so wound that rotation of the rotary part in a direction to raise the load causes the spring coils engaging the rotary part to expand and thereby release the latter for rotation; and
      iv. spring actuating means coacting with the spring to cause the spring to disengage from the fixed part upon rotation of the output member in a direction to lower the load; and
   b. a control means including a one-way clutch interconnecting the spring actuating means and the input member for causing the spring actuating means to effect disengagement of the spring coils from the fixed part when the output member is rotated by the input member in a direction to lower the load.

2. The apparatus of claim 1 wherein the spring actuating means is a sleeve rotatively mounted on the rotary and fixed parts of the spring clutch assembly.

3. The apparatus of claim 1 wherein the spring is a coil spring.

4. In combination with a load actuating apparatus having an input member rotatively connected to an output member to effect bidirectional rotation of the output member and the raising and lowering of a load, a clutch-brake mechanism comprising:
   a. a fixed hub disposed adjacent the output member;
   b. a control sleeve rotatively supported by the output member and hub;
   c. a coil spring having one portion in preloaded engagement with the output member and another portion thereof in preloaded engagement with the fixed hub;
   d. said coil spring having the portion adjacent the fixed hub secured to the control sleeve;
   e. said coil spring being so formed that upon rotation of the output member in a direction to raise the load, the portion of the coil spring engaging the output member is expanded to thereby permit rotation of the output member in that direction; and
   f. a control means interconnecting the control sleeve and input member for transmitting rotation of the input member to the control sleeve so that the portion of the coil spring in engagement with the fixed hub is caused to expand and release the fixed hub and thereby permit controlled, at will, lowering of the load.

5. The apparatus of claim 4 wherein the control means includes a one-way clutch coacting with the input member to transmit rotation of the input member when the latter rotates in a load-lowering direction.

6. The apparatus of claim 4 wherein the control means includes rotary motion transmitting means coacting with a one-way clutch mounted on the input member to transmit rotation of the input member when the latter rotates in a load-lowering direction and interrupt transmission of rotation when the input member rotates in a load-raising direction.

7. The apparatus of claim 4 wherein the control means includes a first gear means secured to the control sleeve, a one-way clutch coacting with the input member to transmit rotation of the input member in a load-lowering direction of rotation and interrupt transmission of rotation of the input member in a load-raising direction of rotation. A second gear means connected to the one-way clutch and rotatively connected to the first gear means to rotate the latter in one direction of rotation and prevent rotation in the opposite direction of rotation.

8. The apparatus of claim 4 wherein the output and input members are shafts connected for transmission of bidirectional rotation through a gear train assembly.

9. The apparatus of claim 4 wherein the input member and output member are connected together for bidirectional rotation through a gear train assembly which includes a speed reducing portion.

10. The apparatus of claim 4 wherein the control means includes a first sprocket connected to the control sleeve for conjoined rotation with the latter, a one-way clutch mounted on the input member to transmit rotation of the input member only in the load-lowering direction of rotation, a second sprocket connected to the one-way clutch for conjoined rotation with the latter, and chain belt extending between and engaging said first and second sprockets to transmit rotation from one to the other.

11. The apparatus of claim 4 wherein the control means is constructed and arranged to rotate the control sleeve at an angular velocity slightly greater than the angular velocity of the output member when the latter is rotated in the load-lowering direction by the input member.